(12) United States Patent
Hall et al.

(10) Patent No.: US 6,738,400 B1
(45) Date of Patent: May 18, 2004

(54) LARGE DIAMETER LASING TUBE COOLING ARRANGEMENT

(75) Inventors: Jerome P. Hall, Livermore, CA (US); Terry W. Alger, Tracy, CA (US); Andrew T. Anderson, Livermore, CA (US); Phillip A. Arnold, Livermore, CA (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 1826 days.

(21) Appl. No.: 08/583,387

(22) Filed: Jan. 5, 1996

Related U.S. Application Data

(63) Continuation of application No. 08/088,090, filed on Jul. 7, 1993, now abandoned.

(51) Int. Cl.[7] .............................. H01S 3/22; H01S 3/08; H01S 3/03
(52) U.S. Cl. ............................... 372/36; 372/56; 372/62
(58) Field of Search ............................... 372/34, 36, 56, 372/61, 62; 313/13; 137/339; 310/341

(56) References Cited

U.S. PATENT DOCUMENTS

| | | | |
|---|---|---|---|
| 3,387,227 A | 6/1968 | Mastrup et al. | 331/94.5 |
| 3,471,801 A | 10/1969 | Woodbury et al. | 331/94.5 |
| 3,487,330 A | 12/1969 | Gudmundsen | 331/94.5 |
| 3,501,714 A | * 3/1970 | Myers et al. | 372/62 |
| 3,668,777 A | 6/1972 | McMahan | 29/628 |
| 3,705,999 A | 12/1972 | Hermann et al. | 313/197 |
| 3,753,144 A | 8/1973 | Kearns et al. | 331/94.5 |
| 3,777,502 A | 12/1973 | Michie III, et al. | 62/55 |
| 3,787,781 A | 1/1974 | Medicus et al. | 331/94.5 D |
| 3,865,184 A | 2/1975 | Grover | 165/105 |
| 3,887,883 A | 6/1975 | Garman | 331/94.5 PE |
| 4,210,389 A | 7/1980 | Burkhart et al. | 350/321 |
| 4,242,646 A | 12/1980 | Macken | 331/94.5 D |
| 4,242,647 A | 12/1980 | Macken | 331/94.5 D |
| 4,486,886 A | 12/1984 | Ream | 372/34 |
| 4,504,954 A | 3/1985 | Güers et al. | 372/61 |
| 4,698,818 A | 10/1987 | Heynisch et al. | 372/34 |
| 4,736,379 A | 4/1988 | Barker et al. | 372/34 |
| 4,752,936 A | 6/1988 | Gerhardt | 372/62 |
| 4,949,354 A | * 8/1990 | Maitland | 372/56 |
| 5,117,435 A | * 5/1992 | Cook et al. | 372/34 |
| 5,150,375 A | * 9/1992 | Tabata et al. | 372/56 |
| 5,274,654 A | * 12/1993 | Warner et al. | 372/34 |
| 5,287,369 A | * 2/1994 | Warner | 372/34 |

FOREIGN PATENT DOCUMENTS

JP 61170084 7/1986

OTHER PUBLICATIONS

T. Kan et al., "Annular discharge copper vapor laser," *Appl. Phys. Lett.*, 35 (9), Nov. 1, 1979, pp. 676–677.
L. B. Direktor, et al., "Thermophysical Characteristics of Coaxial High–Power Laser Chambers," *Teplofizika Vysokikh Temperatur*, vol. 21, No. 1, pp. 162–166, Jan.–Feb. 1983.

\* cited by examiner

*Primary Examiner*—Nelson Moskowitz
(74) *Attorney, Agent, or Firm*—William C. Daubenspeck; Paul A. Gottlieb

(57) ABSTRACT

A cooling structure (16) for use inside a ceramic cylindrical tube (11) of a metal vapor laser (10) to cool the plasma in the tube (11), the cooling structure (16) comprising a plurality of circular metal members (17, 31) and mounting members (18, 34) that position the metal members (17, 31) coaxially in the tube (11) to form an annular lasing volume, with the metal members (17, 31) being axially spaced from each other along the length of the tube (11) to prevent the metal members from shorting out the current flow through the plasma in the tube (11) and to provide spaces through which the heat from localized hot spots in the plasma may radiate to the other side of the tube (11).

14 Claims, 3 Drawing Sheets

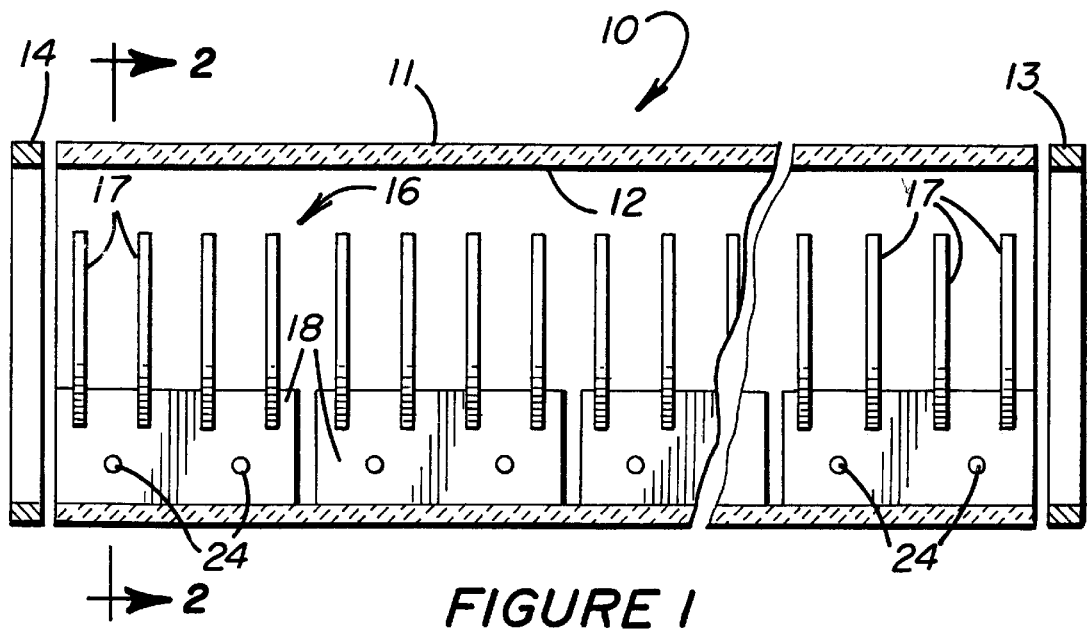
FIGURE 1
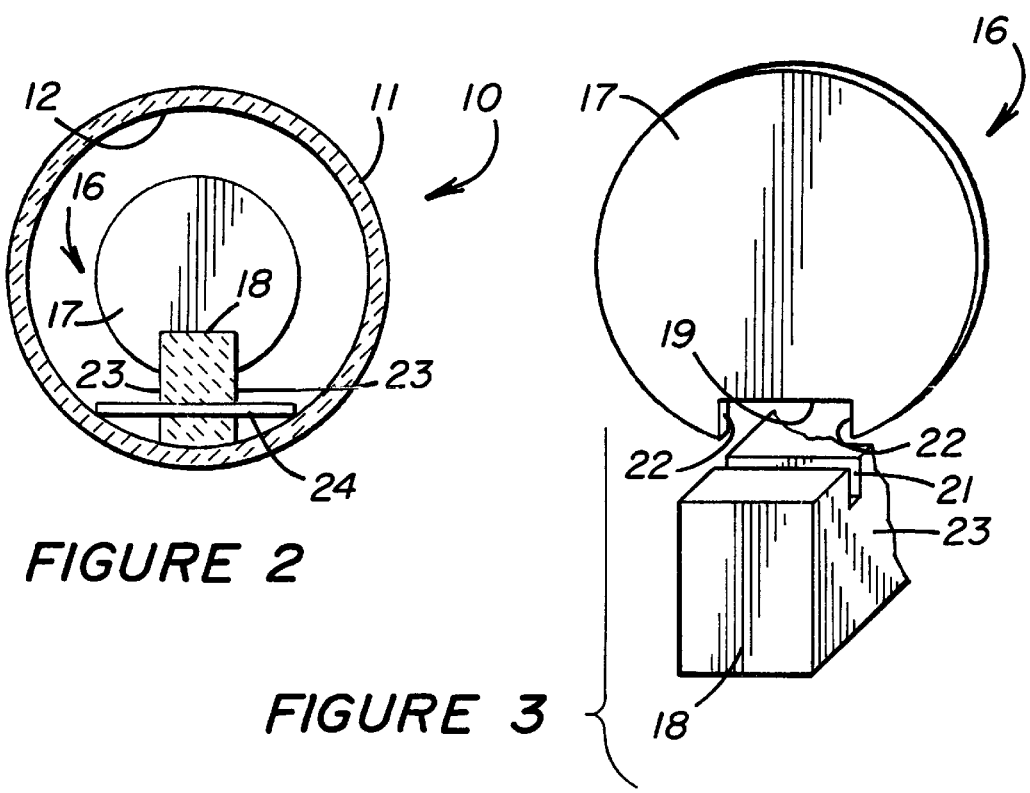
FIGURE 2
FIGURE 3

LARGE DIAMETER LASING TUBE COOLING ARRANGEMENT

This is a Continuation of application Ser. No. 08/088,090 filed Jul. 7, 1993 now abandoned.

STATEMENT OF GOVERNMENTAL RIGHTS

The Government has rights in this invention pursuant to Contract No. W-7405-ENG-48 between the U.S. Department of Energy and the University of California.

BACKGROUND OF THE INVENTION

The copper vapor laser is an efficient source of visible radiation of high average power. Because the laser operates on a transition, the lower level of which is metastable, efficient operation requires a rapid pumping current pulse, and repetitive operation depends on depopulation of the metastable level primarily by collisional means. The majority of high power and efficient copper vapor lasers have utilized discharges in ceramic cylindrical tubes that are up to several meters in length.

The gas discharge, with an inert gas such as neon or helium as the buffer gas, takes place longitudinally along the length of the lasing volume in the ceramic tube between two electrode assemblies located at each end of the ceramic tube. Typically, a metal housing which serves as a coaxial return for the discharge current surrounds the ceramic tube. Near-normal incidence quartz windows held in water cooled mounts terminate the two ends of the vacuum enclosure and serve as the optical aperture windows. Copper vapor is introduced into the discharge at reservoirs located around the inside of the ceramic tube and the extent of the lasing region is determined by the axial temperature profile of the ceramic tube. The laser operates in the self-heated mode in which the discharge power that excites the laser medium also acts as the power source to heat the tube to its operating temperature.

Attempts have been made to increase the power output of such a laser by increasing the diameter of the ceramic tube to thereby increase the lasing volume within the tube. However, as the diameter is increased, the gas temperature increases. This trend continues until a diameter is reached where no further increase in output power is possible because the gas temperature has increased to a level wherein the metastable energy level is thermally populated to such a level that the population inversion necessary for lasing is significantly reduced or not even achieved in much of the lasing volume.

In an attempt to overcome the heating problem in large diameter lasing tubes, an inner ceramic tube has been placed inside the ceramic lasing tube, coaxially therewith, so that an elongated annular lasing volume is formed between the two tubes. Such a structure allows cooling of the gas by wall collisions and gas conduction to the inner ceramic tube. This tube is cooled by thermal radiation to the externally cooled outer ceramic tube. This allows a higher gas discharge volume with increased power density while lowering the gas temperature, and therefore provides more laser output power.

The inner and outer tubes are typically made of ceramic material for two reasons. First, ceramic materials have very high electrical resistivity and thus will confine the current-flow between the electrodes to the annular volume between the two tubes without electrically shorting out such flow. Secondly, suitably chosen ceramic materials will normally resist the high operating temperature, in the order of 1500° C., in a copper vapor laser.

Although the coaxial tube arrangement does provide cooling of the gas between the tubes so that the system can be scaled up in size for increased power output, significant mechanical problems exist because of breakage of the inner and/or outer ceramic tubes. One reason for such failure is that the lasing is often not uniform around the annular lasing volume, but can be concentrated through a small portion of the annulus. Such concentration produces localized heating of the inner and outer tubes. The unevenness of heating causes cracking and eventual destruction of one or both tubes. Another cause of failure is thermal cycling on start up and shut down. This induces thermal shock failures, such as cracking of the ceramic tube.

SUMMARY OF THE INVENTION

It is the principal object of the invention to provide a metal vapor laser having an elongated ceramic tube with an internal structure that will provide an annular lasing volume and will have a much greater resistance to mechanical failure than the inner structures heretofore used.

Additional objects, advantages and novel features will be set forth in the description which follows, and in part will become apparent to those skilled in the art upon examination of the following, or may be learned by practice of the invention. The objects and advantages of the invention may be realized and attained by means of instrumentalities and combinations pointed out in the appended claims.

To achieve the foregoing and other objects, and in accordance with the present invention as described and broadly claimed herein, an inner structure is provided for a metal vapor laser having an elongated ceramic cylindrical tube whose inner surface defines the outer boundary of a lasing volume extending along the length of the ceramic tube, said laser also having electrode assemblies at each end of the ceramic tube, the inner structure comprising a plurality of circular metal members each having a diameter less than the diameter of the inner surface of the ceramic tube, and means for mounting the metal members coaxially in the ceramic tube, with the metal members being spaced physically and electrically from each other along the length of the ceramic tube.

BRIEF DESCRIPTION OF THE DRAWINGS

The accompanying drawings, which are incorporated in and form part of the application, together with the description, serve to explain the principles of the invention.

FIG. 1 is an elevational sectional view of a ceramic lasing tube, with an inner cooling structure in accordance with the present invention.

FIG. 2 is a sectional view of the apparatus of FIG. 1, taken on line 2—2 thereof.

FIG. 3 is a perspective exploded view of a disk and support of FIGS. 1 and 2.

DESCRIPTION OF THE PREFERRED EMBODIMENTS

Figures 4, 5:
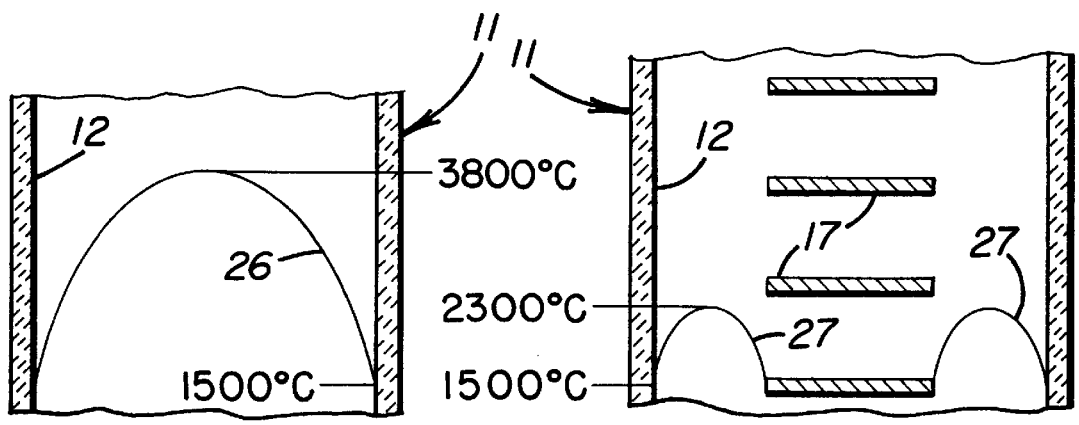
FIGS. 4 and 5 compare the radial temperature profile of a cylindrical gas discharge to that of an annular gas discharge.

Referring now to the drawings, and in particular to FIGS. 1–3, the laser 10 includes an elongated ceramic cylindrical tube 11 whose inner surface 12 defines the outer boundary of a lasing volume extending along the length of the tube 11, and further includes electrode assemblies, indicated generally at 13 and 14, at each end of tube 11. For purposes of simplification, the other portions of an operating laser, such as the vacuum envelope surrounding tube 11, the quartz windows at each end of the laser, the means to cool the exterior of tube 11, the means to feed a buffer gas into tube 11, and so forth, are not shown herein since the conventional details thereof form no part of the present invention.

In accordance with the present invention, a cooling means 16 disposed inside ceramic tube 11 comprises a plurality of metal disks 17 each having a diameter less than the diameter of the inner surface 12 of tube 11, and a plurality of ceramic support blocks 18. The metal disks 17 are notched at 19, so that the disks will fit into grooves 21 of the blocks 18 with the downwardly extending portions 22 of disks 17 embracing the sides 23 of blocks 18, as best seen in FIG. 3. To increase the stability of the cooling means 16 in tube 11, metal pins 24 extending through the blocks 18 may be used to engage the inner surface 12 of tube 11 and thereby maintain the blocks 18 upright, with the disks 17 being held concentrically in tube 11.

Merely for purposes of illustration, a ceramic tube 11 used as a copper vapor laser may have an internal diameter of 14 cm and a length of 3 meters, while the disks 17 have a diameter of 7–10 cm and are spaced from 1–2 cm apart along the length of the tube 11.

Figure 6:
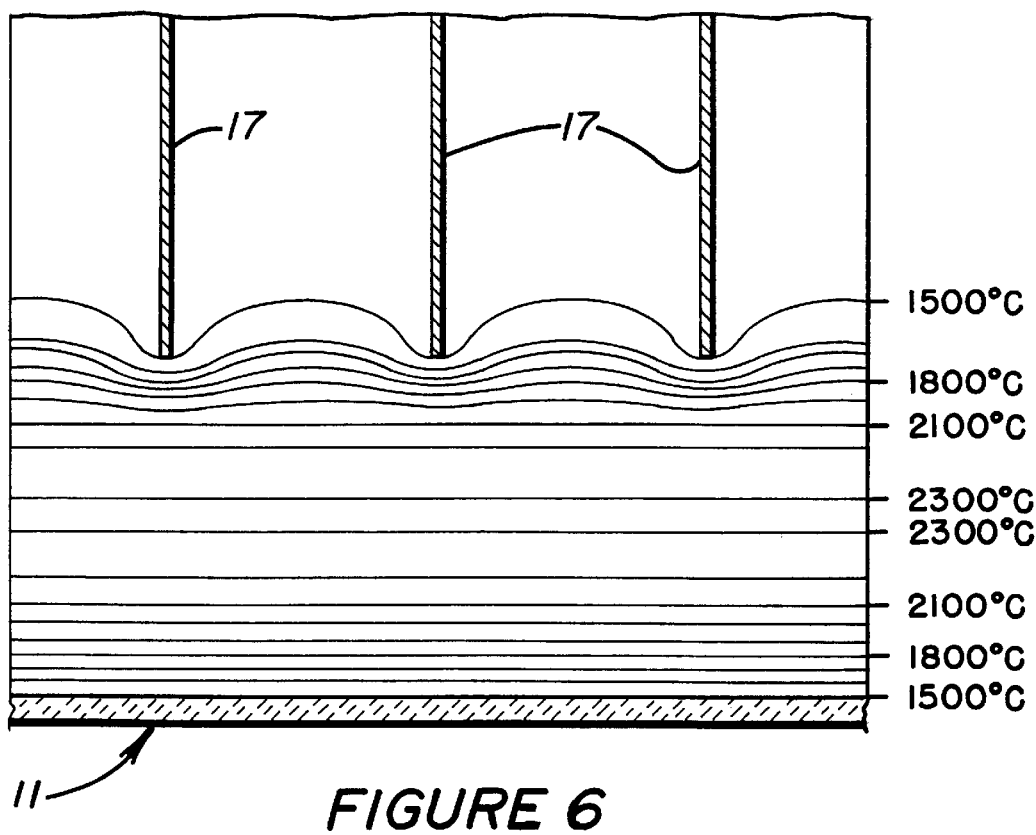
FIG. 6 represents the minor axial temperature variations caused by the spaced metal disks.

In operation, the electrodes 13 and 14 will be repeatedly pulsed, at an operating potential of several tens of kilovolts, to cause repeated gas discharge along the length of the lasing volume in tube 11. FIGS. 4 and 5 illustrate typical radial temperature profiles 26 and 27, respectively, within a copper vapor laser when operating with cylindrical and annular gas discharges. In either case, the ceramic tube 11 will be cooled to maintain the inner surface 12 at an operating temperature in the order of 1500° C. When operating with a cylindrical gas discharge, the temperature in the center of the tube will be in the order of 3800° C. When operating with an annular gas discharge, as in the present invention, the disks 17 will be heated by the plasma in tube 11, but will radiate to the cooler surface 12 of tube 11, with the temperature of the disks being maintained at about 1550° C. The temperature of the plasma in tube 11 along a line halfway between the inner surface of tube 11 and disks 17 will be in the order of 2300° C. FIG. 6 illustrates the effect of the spaced metal disks 17 on the axial temperature profile in the annular gas discharge. At points between disks 17, the cooling of the plasma by the disks will be reduced, and the temperature of the plasma between the disks will increase.

As is thus apparent, the maximum axial spacing between disks 17 must be such that the plasma between the disks is sufficiently cooled by the disks so that the metastable energy level is not populated to such a level that a population inversion is significantly reduced. On the other hand, if the axial spacing between disks is too small, then the cost of the structure will increase without producing a commensurate increase in output power, and the increased number of disks 17 will increase the possibility of component failure.

The optimal diameter of the disks 17 relative to the inner diameter of tube 11 is determined by the same considerations as are involved in the prior use of a ceramic inner cylinder. If the diameters of the disks 17 are too small, then insufficient cooling will be provided. On the other hand, if the diameters of the disks are too great, then the alignment problems will become untenable.

Figure 7:
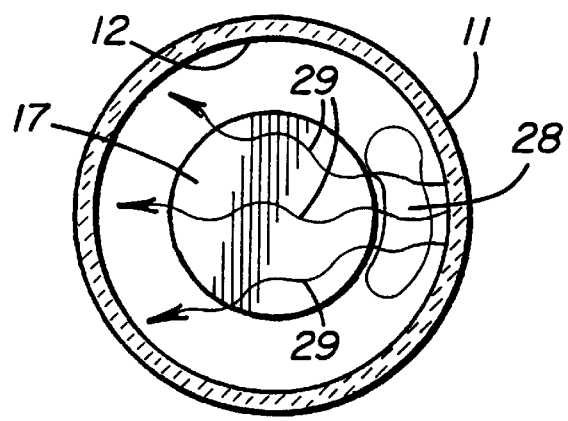
FIG. 7 is a simplified sectional view of the apparatus of FIG. 1, illustrating how the spaced disks allow cooling of localized hot spots by thermal radiation transport.

FIG. 7 illustrates a significant advantage of the use of spaced-apart disks 17 within tube 11. As often happens, the lasing in tube 11 may be concentrated in a small portion of the lasing volume, as indicated at 28 in FIG. 7. In the prior use of ceramic inner tubes, such a hot spot would locally heat the inner and outer tubes, causing undesirable circumferential temperature differences in each tube that lead to cracking and subsequent failure. In the present invention, the hot plasma at 28 will increase the local temperature of tube 11, which can radiate (as illustrated by arrows 29) freely through the open space between the disks to all circumferential portions of the ceramic tube 11.

The metal disks 17 have a much greater mechanical strength and much greater resistance to thermal shock than the heretofore used ceramic inner tubes and are consequently much less prone to failure. The heat conductivity of metal disks is also much higher so that the disks will not become locally heated by hot spots of plasma. Instead, a locally heated disk will have substantially the same temperature throughout itself, and will radiate such heat in all directions to the surrounding surface of tube 11.

Although the metal disks 17 are electrically conductive, the disks are electrically isolated from each other to prevent them from shorting out the plasma between the electrodes 13 and 14.

For use in copper vapor lasers, the metal disks 17 are preferably made of a refractory metal such as molybdenum, tungsten, tantalum, or niobium, in order to withstand the high operating temperatures. Disks used in a metal vapor laser operating at a lower temperature may be made of other metals or alloys, as long as the disks can retain their shape and are chemically compatible at such operating temperatures.

Figure 8:
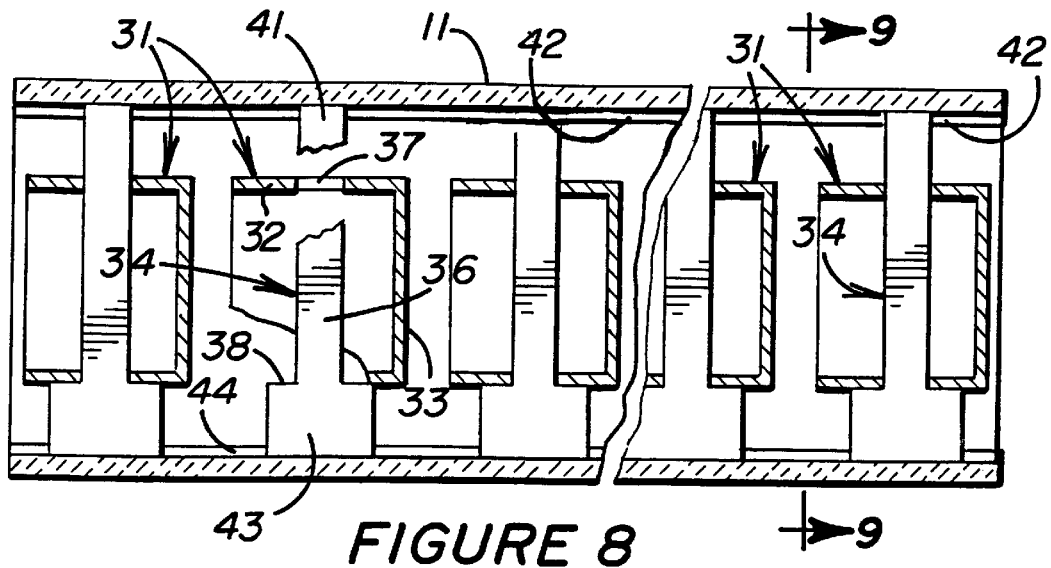
FIG. 8 is an elevational sectional view similar to FIG. 1, with another embodiment of the inner cooling structure of the present invention.
Figure 9:
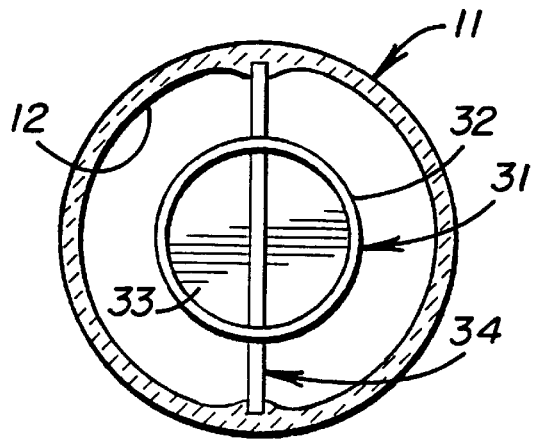
FIG. 9 is a sectional view of FIG. 8, taken on line 9—9 thereof.

FIGS. 8 and 9 illustrate another embodiment of the invention wherein the metal members 31 are can-shaped with a cylindrical portion 32, at least one closed end 33, and a hollow interior. Tee-shaped mounting members 34, of a suitable refractory metal, have a narrow portion 36 passing through diametrically-opposed slots 37 through the cylindrical portion 32 of the metal members 31 and shoulders 38 on which the cylindrical portion 32 rests. The upper end 41 of each mounting member 34 fits within a groove 42 formed in the inner surface of tube 11 and extending length-wise thereof, while the lower end 43 of member 34 fits within a similar groove 44 in ceramic tube 11.

The embodiment of FIGS. 8 and 9 will provide a greater cooling surface inside the tube 11 than the embodiment of FIGS. 1 and 2, but will have less open space between the cooling members through which the heat from hot spots in the plasma can be radiated to opposite inner surfaces of tube 11.

As seen from FIGS. 2 and 9, the cooling structure of FIGS. 8 and 9 will provide less blockage of the annular lasing volume. However, the tube 11 of FIGS. 8 and 9 is more expensive to fabricate because of the grooves 42 and 44 along the inner surface thereof. The cooling structure of FIGS. 1 and 2 is less costly to fabricate, and has an advantage in that the blocks 18 simply sit in the bottom of tube 11.

The foregoing description of the preferred embodiments has been presented for purposes of illustration and description. It is not intended to be exhaustive or to limit the invention to the precise forms described, and obviously many other modifications are possible in light of the above teaching. The embodiments were chosen in order to explain most clearly the principles of the invention and its practical applications, thereby to enable others in the art to utilize most effectively the invention in various other embodiments and with various other modifications as may be suited to the particular use contemplated. It is intended that the scope of the invention be defined by the claims appended hereto.

What is claimed is:

1. A gas discharge laser comprising:
    an elongated ceramic cylindrical tube that encloses a gaseous plasma;
    a plurality of electrode assemblies each located at an end of said elongated ceramic cylindrical tube;
    a plurality of optical elements each located at the end of said elongated ceramic cylindrical tube to contain said gaseous plasma and form an optical cavity;
    a plurality of solid circular metal discs each having a diameter less than a diameter of an inner surface of said ceramic tube such that a substantial gap is formed between a circumferential edge of said circular metal members and said inner surface, said plurality of circular members being located coaxially along the longitudinal length of said elongated ceramic cylindrical tube;
    mounting means, formed of a thermally insulating refractory material, for coaxially mounting said metal discs with the discs separated along the axial direction such that gaseous plasma flows between two adjacent metal members.

2. A gas discharge laser of claim 1, wherein an annular portion of said gaseous plasma has an outer boundary defined by the inner surface of said ceramic cylindrical tube and an inner boundary defined by each circumferential edge of said plurality of circular metal discs.

3. A gas discharge laser of claim 2, wherein lasing occurs within said annular portion.

4. A gas discharge laser of claim 1, wherein said mounting means electrically isolates each of said plurality of circular metal members.

5. A gas discharge laser of claim 1 wherein a ratio of the diameter of said disk to the inner diameter of said ceramic cylindrical tube is less than 4:5.

6. A gas discharge laser of claim 5, wherein a thickness of each of said circular metal discs is substantially less than its diameter.

7. A gas discharge laser of claim 5, wherein said mounting means are a plurality of ceramic support blocks.

8. A gas discharge laser of claim 7, wherein each of said circular metal discs has a notch that fits into a groove of said ceramic support blocks.

9. A gas discharge laser of claim 7, wherein said ceramic support blocks have a curved side that has a curvature approximately equal to a curvature of the inner surface of said elongated ceramic tube.

10. A gas discharge laser of claim 9, wherein pins extend through the ceramic support blocks to engage the inner surface of said elongated ceramic tube.

11. A gas discharge laser comprising:
    an elongated ceramic cylindrical tube that encloses a gaseous plasma;
    a plurality of electrode assemblies each located at an end of said elongated ceramic cylindrical tube;
    a plurality of optical elements each located at the end of said elongated ceramic cylindrical tube to contain said gaseous plasma and form an optical cavity;
    a plurality of circular metal members, each including a solid, circular metal disk portion having a circumferential edge coupled to a cylindrical metal portion to form a can-shaped structure with a hollow interior and an open end, with the each circular metal disk portion each having a diameter less than a diameter of an inner surface of said ceramic tube such that a substantial gap is formed between a circumferential edge of said solid, circular metal disc and said inner surface, said plurality of circular members being located coaxially along the longitudinal length of said elongated ceramic cylindrical tube;
    mounting means, formed of a thermally insulating refractory material, for coaxially mounting said metal discs with the discs separated along the axial direction such that gaseous plasma flows between two adjacent metal members.

12. A gas discharge laser of claim 11, wherein said mounting means is a flat T-shaped refractory member having a narrow portion passing through diametrically-opposed slots in said cylindrical metal portion such that a shoulder of said T-shaped metal member adjoins an outer surface of said cylindrical metal portion, each end of said T-shaped refractory member fitting within a groove formed in the inner surface of said elongated ceramic cylindrical tube.

13. A gas discharge laser of claim 1, wherein said gaseous plasma is a copper vapor.

14. A gas discharge laser of claim 1, wherein said metal members are made of a refractory metal selected from the group consisting of molybdenum, tungsten, tantalum and niobium.

* * * * *